United States Patent [19]
Offner

[11] 3,748,015
[45] July 24, 1973

[54] UNIT POWER IMAGING CATOPTRIC ANASTIGMAT

[75] Inventor: Abe Offner, Darien, Conn.

[73] Assignee: The Perkin-Elmer Corporation, Norwalk, Conn.

[22] Filed: June 21, 1971

[21] Appl. No.: 154,948

[52] U.S. Cl.................... 350/55, 350/199, 350/294
[51] Int. Cl. .......................................... G02b 17/00
[58] Field of Search.............. 350/55, 294, 199–201; 35/12 N

[56] References Cited
UNITED STATES PATENTS

| | | | |
|---|---|---|---|
| 3,190,171 | 6/1965 | Reed...................................... | 350/55 |
| 3,062,101 | 11/1962 | McCarthy............................. | 350/55 |
| 3,527,526 | 9/1970 | Silvertooth........................... | 350/294 |

Primary Examiner—David H. Rubin
Attorney—Edward R. Hyde, Jr.

[57] ABSTRACT

A catoptric system for forming in accurate micro detail an image of an object at unit magnification with high resolution is provided by convex and concave spherical mirrors arranged with their centers of curvature coinciding at a single point. The mirrors are arranged to produce at least three reflections within the system and they are used in the system with their axial conjugates at said point and to provide two off axis conjugate areas at unit magnification in a plane which contains the center of curvature, the axis of the system being an axis normal to the latter plane and through said point. This combination is free from spherical aberration, coma and distortion and, when the algebraic sum of the powers of the mirror reflecting surfaces utilized is zero, the image produced is free from third order astigmatism and field curvature.

10 Claims, 8 Drawing Figures

Patented July 24, 1973
3,748,015
3 Sheets-Sheet 1
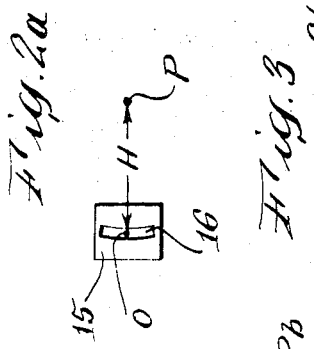
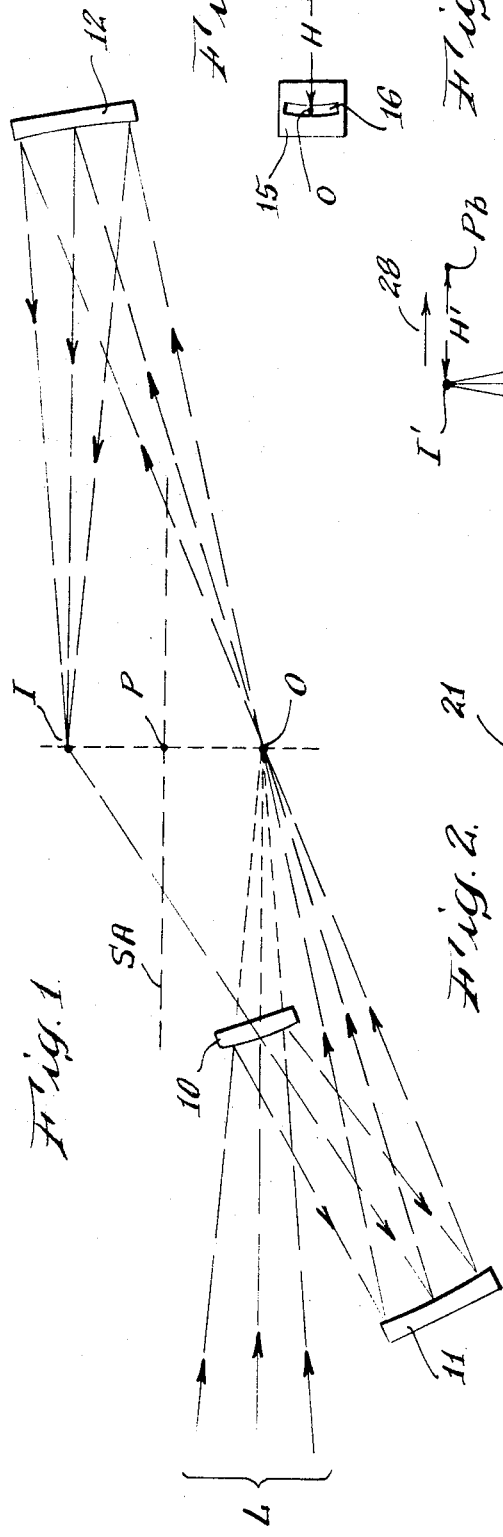
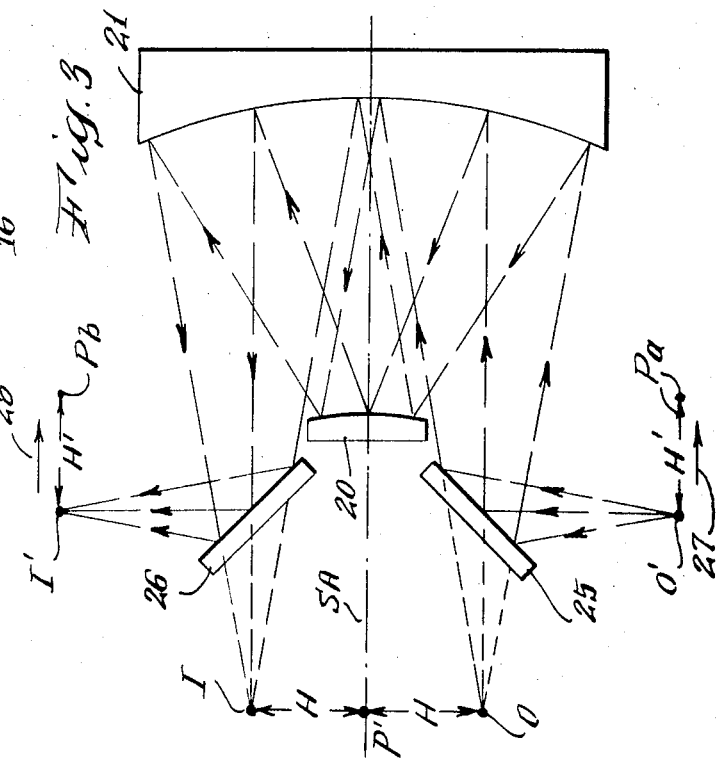
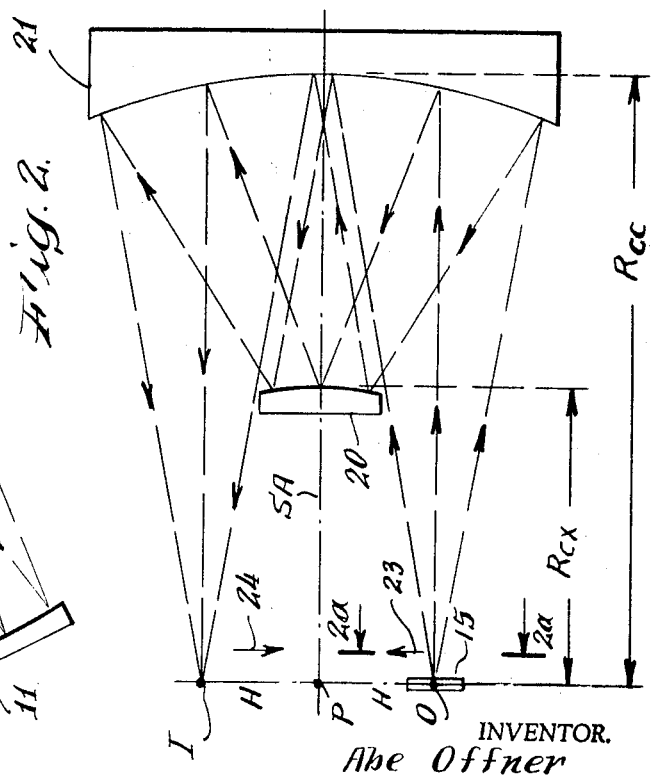
INVENTOR.
Abe Offner
BY John K. Conant
ATTORNEY Patented July 24, 1973
3,748,015
3 Sheets-Sheet 2
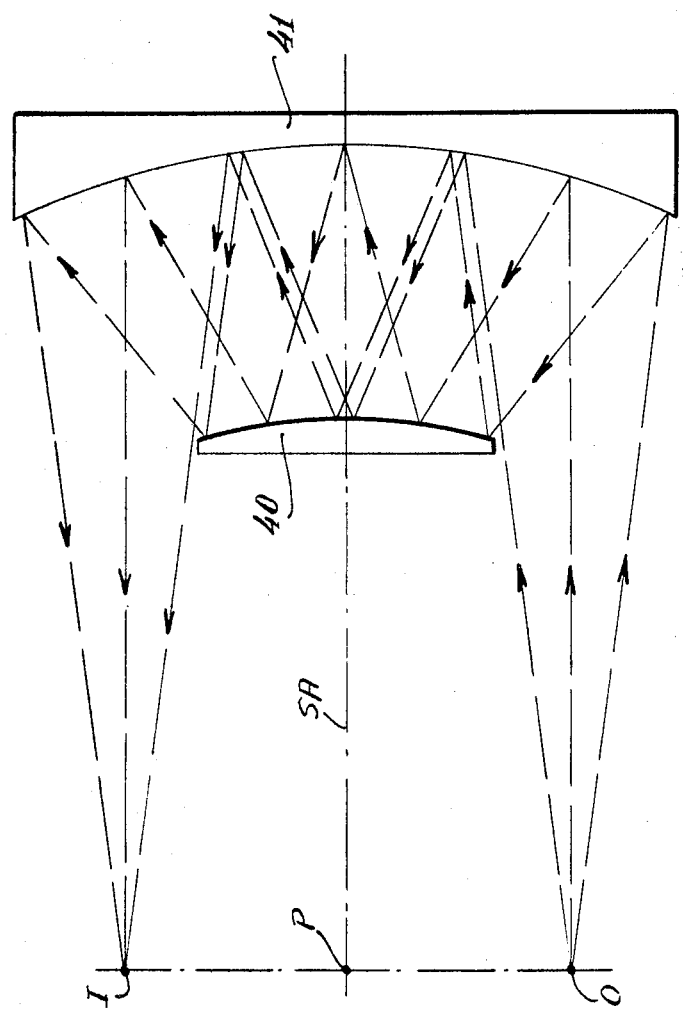
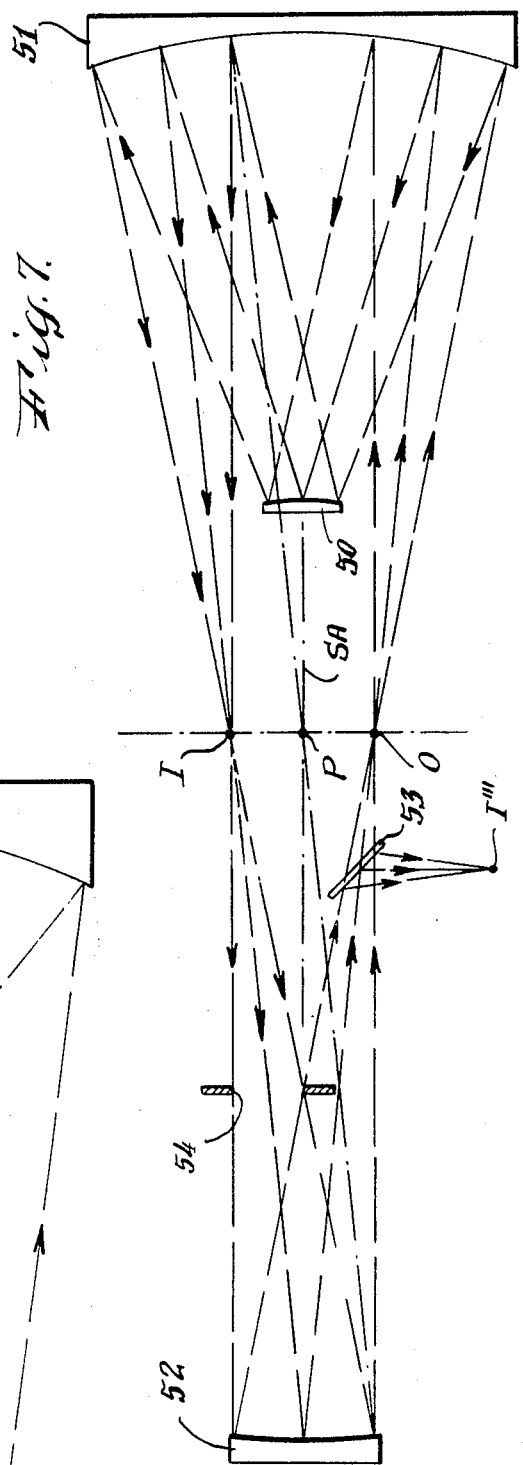
INVENTOR.
Abe Offner
BY John K. Conant
ATTORNEY.

Patented July 24, 1973

INVENTOR.
Abe Offner
BY John K. Conant
ATTORNEY

UNIT POWER IMAGING CATOPTRIC ANASTIGMAT

The present invention relates to optical systems for forming an image of an object at unit magnification. In particular the invention relates to a catoptric system in which the image is formed in accurate micro detail with high resolution.

Various optical systems for forming images at unit or other magnifications are known. In catoptric systems a portion of the aperture is normally obscured. This results in a loss of contrast of the images produced by these systems. The use of beamsplitters to avoid the effects of central obscuration in catoptric systems has been suggested, but it is difficult to make these of adequate quality in large sizes and the scattering they introduce reduces the contrast of the image.

A principal object of the present invention is to provide a distortion-free unit magnification all-reflecting optical system with accessible object and image planes in which the contrast is uniformly high and substantially constant for all parts of the format and in which the alignment of the system is independent of the spectral region used in the image formation.

In brief, the system of this invention incorporates convex and concave spherical mirrors arranged with their centers of curvature coinciding at a single point. The mirrors are arranged with their axial conjugates at the latter point and are arranged to provide two off axis conjugate areas at unit magnification in a plane which contains this point, the reference axis of this system being an axis normal to the latter plane and through the point. This provides a system which is free from spherical aberration, coma and distortion and provides diffraction limited performance for systems of the subject type having moderate apertures and fields.

In catoptric systems of this invention the radial image surface is flat to all orders of aberration, consequently the magnitude of the third order curvature of the tangential field is equal to double the algebraic sum of the powers of the reflecting surfaces utilized. In several of the illustrative embodiments subsequently described, two or more reflecting surfaces are in fact portions of a single mirror, and it will be appreciated that in this case each reflection could be provided by a separate mirror. Also, in determining the sum of the powers, the power of each reflecting surface portion is added for each reflection therefrom.

If, in a particular system embodying this invention, the reflective surfaces are made so that the algebraic sum of their powers is zero, the particular system will be afocal. In a practical system of this type there must be at least three reflections.

Further objects, advantages and features of the optical system of this invention will be apparent from the following more detailed description of exemplifying embodiments illustrated in the accompanying drawings in which:

FIG. 1 is a schematic illustration of one form of unit power catoptric system in accordance with this invention;

FIG. 2 is a schematic illustration of a second embodiment;

FIG. 2a is a view taken along the lines 2a—2a of FIG. 2;

FIG. 3 illustrates a modification of the embodiment shown in FIG. 2;

FIG. 6 is a schematic illustration of a third embodiment of the invention; and

FIG. 7 is a schematic illustration of a fourth embodiment of the invention.

Figure 4:
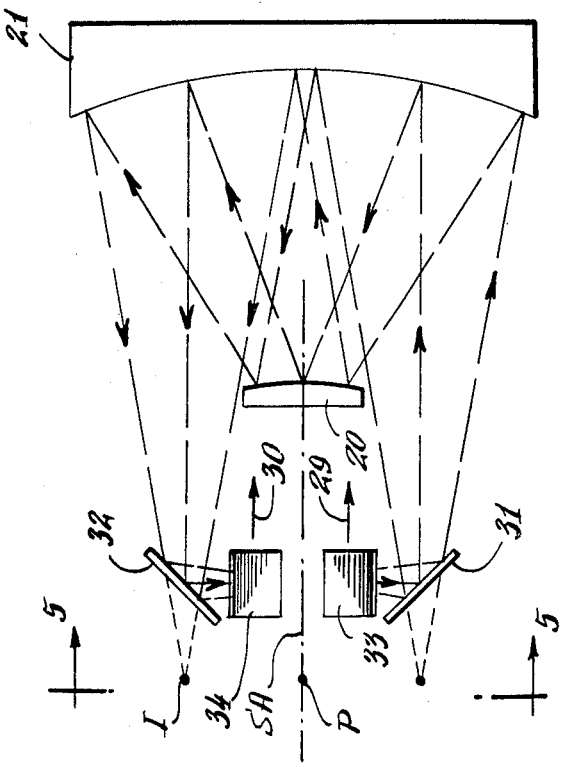
FIG. 4 is another modification of the embodiment shown in FIG. 2.

Referring to FIG. 1, the embodiment shown therein consists of a convex spherical mirror 10, a first concave spherical mirror 11 and a second concave spherical mirror 12 arranged with their centers of curvature coinciding at a point P. The respective mirrors are arranged so that light L entering from the left and converging toward point O is reflected by a convex mirror 10 to form a virtual image at the conjugate point I. The first concave mirror 11 reflects the light to the conjugate image point O. The second concave mirror 12 is positioned so that for an object point at O, the corresponding conjugate image point is at I. The points P, O and I are on a single line. Object and image areas about the points O and I, respectively, are in a plane containing this line. The reference axis of the system designated SA is normal to this plane through the point P; this relationship of the points P, O and I and the system axis is the same in any system constructed in accordance with this invention.

FIG. 2 illustrates a preferred embodiment of the invention in which two spherical mirrors, a convex mirror 20 and a concave mirror 21, are arranged to provide three reflections within the system. The mirrors are arranged with their centers of curvature coinciding at point P and to have off axis conjugate areas centered at the points at O and I. The points O and I are each a distance H from the reference axis SA at opposite sides thereof. The concave mirror 21 forms an image of the object O at I; the convex mirror 20 forms a virtual image of point I at point O which is reimaged by the concave mirror 21 at I. Since there are two reflections from the concave mirror 21, if the radius Rcc of the concave mirror 21 is twice the radius Rcx of the convex mirror 20, the algebraic sum of the powers of the reflective surfaces utilized is zero; the system is then corrected for all third order aberrations and the only fifth order aberration is curvature of the tangential field which is concave towards the mirrors. The distance $D_5$ from the Gaussian image plane (the plane containing points P, O and I) to the tangential image for an object point which is distance H from the axis SA is given by the expression $D_5 = 2H^4/Rcc^3$. Ray tracing through this system shows that the effects of higher order aberrations are negligible compared to the effect of fifth order astigmatism.

A system as shown in FIG. 2, in which the radius Rcc is twice the radius Rcx, provides diffraction limited performance for moderate apertures and fields. For example, if Rcc is 1,000 mm. and Rcx is 500 mm., the minimum value of H in which there will be no vignetting at f/10 is 50 mm. If H is 85 mm., the value of $D_5$ would be 0.1 mm. which corresponds to a one-fourth wavelength defocus for a wavelength of 5,000 Angstroms. A focal position can thus be found such that the imagery at f/10 for all points in a 32 mm. by 45 mm. format is no worse than one-eighth of the wavelength. The format size can be increased to a 45 mm. by 60 mm. and will provide imagery no worse than one-fourth wavelength at $f/10$ for a 5,000 Angstrom wavelength.

Concentric mirror systems for unit power imagery in accordance with this invention can be used in a scanning mode to give aperture limited performance at a low $f$/number over a large field. For this purpose, the system is kept concentric but the radius of a convex mirror is increased over that required for zero Petzval sum. This introduces third order tangential field curvature of opposite sense to the fifth order tangential field curvature discussed above. In the system of FIG. 2, the radius change $\Delta R_{cx}$, required to achieve stigmatic imagery at the height H is given approximately by the formula $\Delta R_{cx} = H^2/4R_{cc}$; Rcx is then approximately $(Rcc)/(2) + H^2/4Rcc$.

Following the teaching of Roderic M. Scott disclosed in a copending U.S. patent application for "Annular Field Optical Imaging System", Ser. No. 154,985 filed June 21, 1971 and assigned to the same assignee as the instant application, if a mask 15, shown in FIG. 2a, containing a curved slit 16 of radius H is placed with its center of curvature at the optical system center of curvature, point P, and in the object plane at O, as shown in FIG. 2 so as to restrict the imagery to that portion of the object area which is exposed through the slit 16, that portion of the object area will be imaged stigmatically into a similar curved area in the image plane. This comes about because all portions of the object and image that are in the slit, or in the image of the slit, are all at the same distance H from the system center of curvature, point P, at which the system is corrected. The mask 15 could also be placed in the image plane at I, or a mask 15 could be provided in each plane. In the case of an optical system of the type shown in FIG. 2, the object and image planes are coincident since both object and image points O and I lie in the plane through the center of curvature P which is normal to the reference axis SA. The increase of the convex radius of mirror 20 required for stigmatic imaging at height H is equal to the longitudinal third order spherical aberration of the concave mirror for a ray parallel to an axis and at a height H. With this modification, the system of FIG. 2 becomes afocal at the height H with the result that errors of focus and/or longitudinal positions of the conjugates have no effect on the magnification of the system.

In a specific example of the system shown in FIG. 2 in which the radius Rcc of the concave mirror 21 is 500 mm. and H is 84.34, the radius of curvature of the convex mirror 20 is increased by 3.592 mm. from the value required for zero Petzval sum in this system. But note that the value of $\Delta Rcx$ computed by the formula given above is 3.557 mm., which gives an indication of the degree of approximation of the formula. The rms wave front deformation in the image of any point in a ring of radius 84.34 mm. is about $\lambda/40$ at $\lambda = 5,000$ Angstroms. In the system of FIG. 2, when the object, such as a photographic transparency, is moved past the slit 16 in the direction 23, a unit power image of that portion of the object exposed by the slit is formed at I and moves past I, in the opposite direction 24. Thus in order to receive a clear image at I, an image receiving surface would have to move past the point I in a direction opposite the direction of movement of an object transparency past a slit 16 at 0.

In the practical implementation of a scanning system, it is convenient to have the object and an image receiving surface move in the same direction rather than oppositely as in the system of FIG. 2. Means for achieving this is shown in FIG. 3. As shown a plane mirror 25 is arranged to deflect the object point O to O'; the center of curvature P, as seen through the mirror 25, is thus at the position Pa. A second plane mirror 26 is arranged to deflect the image point I to I' so that the center curvature P is shifted to Pb relative to mirror 26. Thus when an object moves past point O' in the direction 27, the image moves across an image receiving surface at I' in the same direction as indicated by arrow 28. With this arrangement, an object and an image receiving surface can be mounted on a single carriage and by moving the carriage in the direction of reference axis SA for a scanning operation, the object moves past a slit 16 at O' and the image moves at the same speed past the conjugate slit 37 image at I'. True motion of the carriage then assures no image motion with respect to the image receiving surface.

Other configurations can also be used for this purpose. In FIG. 3 mirrors 25 and 26 deflect the principal rays from the concave mirror 21 to the original object point O and to the original image point I, respectively, 90° down and 90° up in relation to the system axis SA so that the object point O and the image point I are each deflected to the new positions O' and I'. Thus the angular positions of the planes of the original object and image areas are deflected a total of 180° apart. Any other arrangement in which the original coplanar object and image areas are deflected to be 180° apart would also result in image motion in the same direction as the object motion.

Figure 5:
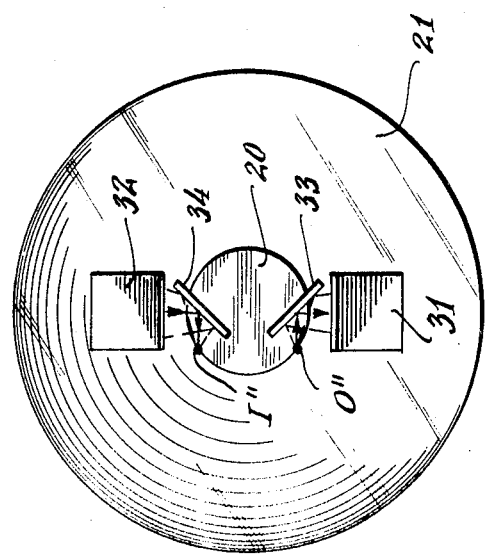
FIG. 5 is a view at right angles to the view of FIG. 4 showing the system of FIG. 4 in end elevation along the lines 5—5 of FIG. 4.

In the configuration of FIG. 3, the image orientation with respect to the object is that usually described as a "mirror image", that is the image is not inverted but it is reversed. FIGS. 4 and 5 illustrate a configuration in which four mirrors are used to produce an image that is neither inverted or reversed with respect to the object. As shown, plane mirrors 31 and 32 deflect the object point O and image point I in opposite directions — both inward toward the axis SA in this case — to two other plane mirrors 33 and 34 which then deflect the object and image points O and I in the same direction to the points O'' and I'' (FIG. 5). With this configuration an object, such as a transparency, and an image receiving surface at the points O'' and I'' will be side by side in a plane parallel to the axis SA and may be moved in the same direction, in the direction of the axis SA, for operation in a scanning mode.

Various other arrangements of concentric spherical convex and concave mirrors for producing unit magnification imagery in accordance with the present invention are possible as illustrated by the embodiments shown in FIGS. 6 and 7. FIG. 6 shows an arrangement including a convex mirror 40 and a concave mirror 41 arranged coaxially and concentric about point P in a manner utilizing a total of five reflections within the system, these being three reflections from concave mirror 41 and two from convex mirror 40. In this embodiment the algebraic sum of the powers of the reflecting surfaces utilized is zero when the radius of the convex mirror 40 is two-thirds that of the concave mirror 41.

FIG. 7 illustrates an embodiment in which three mirrors, a convex mirror 50 and two concave mirrors 51, 52, provide four reflections within the system between object point O and image point I. In this system the convex mirror 50 and the primary concave mirror 51 are at one side of the plane defined by the points P, O and I and the secondary concave mirror 52 is at the other side. In this arrangement point I is an intermediate image point and is the conjugate object point of the second concave mirror 52 whose conjugate object and image points are thus at the designated system image and object points I and O. In order to render the image from the mirror 52 accessible, a plane mirror 53 is interposed between the mirror 52 and point O, which is the conjugate image point of mirror 52, so that the mirror 53 shifts the final image to an image point designated I'''. This FIG. 7 embodiment is of particular interest because when used telecentrically it can be provided with an accessible pupil, such as the pupil indicated at 54 between the concave mirror 52 and the system image point I. This arrangement is particularly adapted for data processing uses, the pupil 54 providing a "transform plane" available for data processing applications.

What is claimed is:

1. A unity magnification catoptric image-forming system comprising at least one concave mirror and at least one convex mirror, said mirrors being supported with their centers of curvature substantially coincident, and means to define a location for an object the image of which after at least three reflections including at least one reflection at each of said mirrors is a real image at a second location, the sum of the powers of said convex mirrors multiplied by the numbers of reflections thereat respectively being sufficiently less than the sum of the powers of said concave mirrors multiplied by the numbers of reflections thereat respectively to produce at said second location a stigmatic image of an object in said first location.

2. An image-forming system according to claim 1 wherein the image at said second location includes third order tangential field curvature of one sense and higher order tangential field curvature of opposite sense.

3. A unity magnification catoptric image-forming system comprising a concave spherical mirror and a convex spherical mirror, said mirrors being supported with their centers of curvature substantially coincident, and means to define a location for an object the image of which in said concave mirror is a real image at a second location, said convex mirror being positioned about said center of curvature to reflect to said concave mirror light from said object location initially reflected to said convex mirror from said concave mirror, thereby light from said object location will be reflected at least twice at said concave mirror an: at least once at said convex mirror before being focused at said second location, the power of said convex mirror multiplied by the number of reflections thereat being sufficiently less than the power of said concave mirror multiplied by the number of reflections thereat to produce at said second location a stigmatic image of an object in said first location.

4. An image-forming system according to claim 3 wherein the focused image at said second location includes third order tangential field curvature of one sense and higher order tangential field curvature of opposite sense.

5. A unity magnification catoptric image-forming system comprising a concave spherical mirror and a convex spherical mirror supported with their centers of curvature substantially coincident, and means to define in a plane containing said centers of curvature an object location the image of which in said concave mirror is a real image at a second location in said plane, said convex mirror having a radius of curvature substantially equal to one-half the radius of said concave mirror increased by the square of the distance in said plane from said centers to said object location divided by four times the radius of the concave mirror, said convex mirror being positioned with respect to said concave mirror to reflect to the concave mirror light diverging from said object location initially reflected to said convex mirror from said concave mirror whereby light from said object location will be reflected twice at said concave mirror and once at said convex mirror before being focused at said second location.

6. An image-forming system according to claim 5 wherein said defining means include at least one plane mirror, said system including at least one additional plane mirror disposed between the last reflection at said concave mirror and said second location, the sum of the inclinations of said plane mirrors to the normal to said plane amounting substantially to 180°.

7. The image-forming system of claim 5 wherein said defining means include an arcuate slit of radius substantially equal to the distance of said object location from said centers of curvature.

8. A unity magnification catoptric image-forming system comprising a concave spherical mirror and a convex spherical mirror supported with their centers of curvature substantially coincident, and means to define in a plane containing said centers of curvature an object location the image of which in said concave mirror is a real image at a second location in said plane, said convex mirror having a radius of curvature substantially equal to one-half the radius of said concave mirror increased by an amount substantially equal to the third order longitudinal spherical aberration of said concave mirror for a ray from said object location perpendicular to said plane, said convex mirror being positioned with respect to said concave mirror to reflect to the concave mirror light diverging from said object location initially reflected to said convex mirror from said concave mirror whereby light from said object location will be reflected twice at said concave mirror and once at said convex mirror before being focused at said second location.

9. A unity magnification catoptric image-forming system comprising a concave mirror and a convex mirror, said mirrors being supported with their centers of curvature substantially coincident, means to define in a plane containing said centers a location for an object the image of which in said concave mirror is a real image at a second location in said plane, said convex mirror being positioned about said centers to reflect to said concave mirror light from said object location initially reflected to said convex mirror from said concave mirror, whereby light from said object location will be reflected at least twice at said concave mirror and at least once at said convex mirror before being focused at said second location, and a second concave mirror positioned on the side of said plane opposite said first-named convex and concave mirrors to refocus light diverging from said second location, the power of said convex mirror multiplied by the number of reflections thereat being sufficiently less than the sum of the powers of said concave mirrors multiplied by the numbers of reflections thereat respectively to produce at the image of said second location in said second concave mirror a stigmatic image of an object in said first location.

10. A unity magnification catoptric image-forming system comprising at least one convex mirror and at least two concave mirrors, said mirrors being supported with their centers of curvature substantially coincident, at least one of said convex mirrors and at least one of said concave mirrors being disposed on one side of a plane containing said centers of curvature, at least one other of said concave mirrors being disposed on the other side of said plane, those of said convex and concave mirrors on said one side of said plane being positioned to form upon successive reflections thereat including at least two reflections at said one concave mirror and at least one reflection at said one convex mirror an image in said plane of an object in said plane, which image is reimaged at a separate location in said plane by reflections at those of said mirrors on the other side of said plane, the sum of the powers of said convex mirrors multiplied by the number of reflections thereat respectively being substantially equal to the sum of the powers of said concave mirrors multiplied by the numbers of reflections thereat respectively.

* * * * *